INVENTORS.
VIRGIL D. DRUMMOND
RAPHAEL KATZEN
MERLE L. GOULD
BY Leonard L. Kalish
ATTORNEY.

INVENTORS.
VIRGIL D. DRUMMOND
RAPHAEL KATZEN
MERLE L. GOULD
BY
ATTORNEY.

3,055,745
CATALYTIC REACTOR
Virgil D. Drummond, South Port, Conn., and Merle L. Gould and Raphael Katzen, Cincinnati, Ohio, assignors to Vulcan-Cincinnati, Inc., Cincinnati, Ohio, a corporation of Ohio
Filed Nov. 7, 1952, Ser. No. 319,376
7 Claims. (Cl. 23—288)

This invention relates to a catalytic reactor, and more particularly to a catalytic reactor for the catalytic oxidation of olefins.

This invention has as an object the provision of a catalytic reactor useful for exothermic catalytic reactions.

The invention has a further object the provision of a catalytic reactor useful for the catalytic oxidation of olefins to olefin oxides.

This invention has a further object the provision of a catalytic process for effecting exothermic catalytic reactions.

This invention has as a different object the provision of a process for effecting fluid catalytic operations.

This invention has as another object the provision of a process for effecting the catalytic oxidation of olefins to olefin oxides.

These and other objects are effected by the catalytic reactor and catalytic process of our invention. The catalytic reactor of our invention comprises a lower manifold chamber having an inlet for introducing gaseous reactants thereto and an upper manifold chamber. The reactor outlet is beyond and in gas-communication with the upper manifold chamber. Between the upper and lower manifold chambers are a plurity of upright open catalytic tubes in gas-communication with the manifold chambers. It is advantageous that the catalytic tubes be disposed in a median chamber, intermediate the lower and upper manifold chambers, so that heat-exchange can be effected between the tubes and a heat-exchange medium contained in the median chamber. Each upright open catalytic tube is provided with an orifice at its base of a relatively small cross-sectional area when compared with the cross-sectional area of the main body of the catalytic tube, so that the gaseous reactants issuing therefrom are impelled turbulently upward through the main body of the catalytic tubes at a velocity greater than either the inlet velocity of the gaseous reactants, or the velocity of the gaseous reactants in the main body of the catalytic tubes, namely, a velocity necessary to maintain a fluidized bed of catalyst particles of 80 mesh size or smaller.

In a preferred embodiment of our invention it is most advantageous to provide such catalytic tube with a calming-section (having a cross-sectional area intermediate the greater cross-sectional area of the main body of the catalytic tubes and the lesser cross-sectional area of the basal orifice) interjacent the basal orifice and the main body of the catalytic tube to both reduce the velocity of the incoming gaseous reactants to the velocity necessary for maintaining a fluidized dense-phase catalyst bed in the main body of the catalytic tube and to eliminate the turbulency of the impelled gaseous reactants so that a substantially straight line flow of gaseous reactants is maintained through the main body of the catalytic tube. Elimination of the gas turbulency prevents any appreciable abrasive disintegration of the fluidized dense-phase catalyst bed contained in the catalytic tubes.

In another preferred embodiment of the reactor of our invention, at least one filter should be provided in the upper manifold chamber above the catalytic tubes to retain the catalyst particles within the reactor. The filter is in gas-communication with the reactor outlet so that the reaction products and unconverted gaseous reactants are removed therefrom.

The catalytic process for which the catalytic reactor of our invention is adapted comprises accelerating a gaseous reactant turbulently upward to a high velocity in excess of that which can maintain catalyst particles having a mesh size of 80 mesh or smaller suspended as a fluidized bed, and then substantially reducing the velocity of the gaseous reactant to a lean-phase velocity slightly above that which can maintain such catalyst particles suspended as a fluidized dense-phase bed, and substantially eliminating its turbulency. The gaseous reactant is then passed upwardly in substantially straight line flow at an incrementally lower dense-phase velocity sufficient to maintain a fluidized dense-phase bed of such catalyst particles. The gaseous reactant is catalytically converted into reaction product by contact with the fluidized dense-phase bed of catalyst particles and then the reaction product is withdrawn from the fluidized dense-phase bed of catalyst particles at a lean-phase velocity below the dense-phase velocity.

By "catalyst bed" or "catalyst particles" we mean a catalyst bed or catalyst particles comprising a catalytic component disposed as the catalytic component per se or composited with other materials and which may also contain other particles such as inert filler particles and/or catalytic suppressor particles, etc. By "lean-phase velocity" we mean a velocity for the gaseous reactant which can maintain a fluidized lean-phase bed, sometimes referred to as a fluidized dilute-phase bed, of catalyst particles having a mesh size of 80 mesh or smaller. By "dense-phase velocity" we mean a velocity for the gaseous reactant which can maintain a fluidized dense-phase bed of particles having a mesh size of 80 mesh or smaller.

In a preferred modification of the aforementioned process, the incoming gaseous reactant feed is divided into a plurality of separated gaseous reactant streams. Each of the gaseous reactant streams is accelerated turbulently upward at a high velocity in excess of that which can maintain catalyst particles of 80 mesh size or smaller as a fluidized bed. The velocity of each of said gaseous reactant streams is then reduced to a lean-phase velocity slightly above that which can maintain such catalyst particles in a fluidized dense-phase bed and simultaneously the turbulency of the impelled gaseous reactant is substantially eliminated. Each of the gaseous reactant streams is then passed upwardly in substantially straight line flow through separate fluidized captive dense-phase catalyst beds of particles and through an equilizer fluidized dense-phase catalyst bed surmounting and connecting each of the separate fluidized captive dense-phase catalyst beds. The gaseous reactant in each stream is catalytically converted into reaction product by contact with the fluidized dense-phase catalyst beds and the equalizer fluidized dense-phase catalyst bed. After passing through the equilizer fluidized dense-phase catalyst bed, the reaction product and any unconverted gaseous reactant are removed at a lean-phase velocity below the dense-phase velocity.

By "fluidized captive dense-phase catalyst bed" we means a fluid bed which forms a self-contained entity and from which particles are not withdrawn for the purposes of regeneration or for other purposes and to which particles are not added except to replace a minor amount of the bed which has been lost during the course of the process.

The process for which the catalytic reactor of our invention is adapted is especially useful for exothermic reactions such as the Fischer-Tropsch reaction, and in particular for the catalytic oxidation of olefins to olefin oxides. Thus, in the catalytic oxidation of an olefin such as ethylene to ethylene oxide, it is desirable to control the temperature of the reaction within definite limits. Inasmuch as the reaction is highly exothermic it is necessary to remove the exothermic heat of reaction rapidly from the reaction. The embodiment of the process of our invention which comprises passing the gaseous reactant, in the instant case a mixture of ethylene and a gas containing molecular oxygen, such as air, upwardly through a plurality of separate fluidized catalyst beds permits the rapid removal of heat from each of the beds and a close control of the temperature.

As illustrative of the catalytic reactor of our invention, reference should be had to the accompanying figures which are hereby incorporated into our application and made a part thereof.

Figures 1, 2:
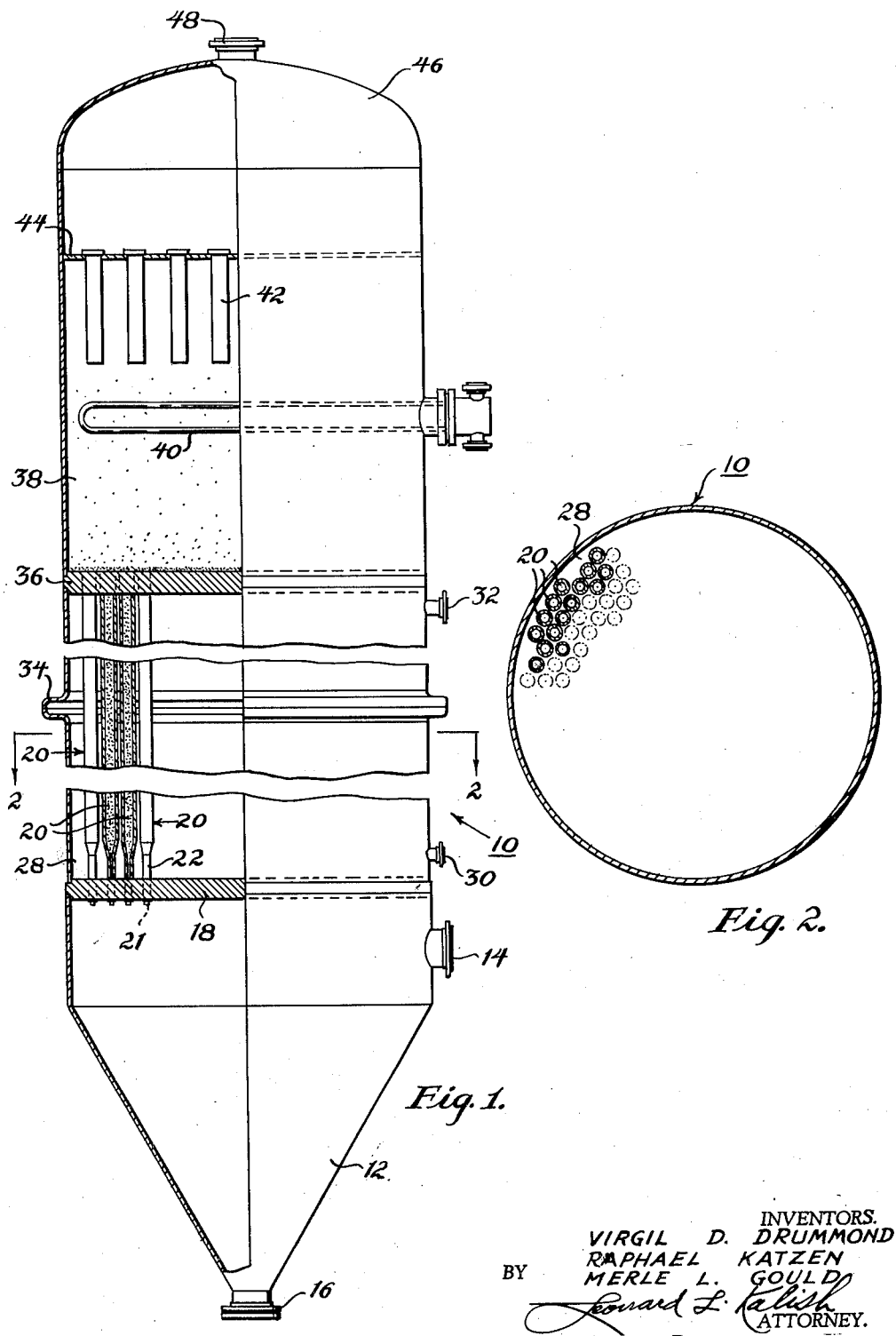
FIGURE 1 is a diagrammatic representation, partly in section and partly in elevation, of a catalytic reactor of our invention.
FIGURE 2 is a cross-sectional view taken on line 2—2 of FIGURE 1.

Referring to FIGURE 1, catalytic reactor 10 comprises a compartmented cylindrical vessel having a lower manifold chamber 12 provided with a recator inlet 14. A dump outlet 16 is provided at the base of lower manifold chamber 12. Dump outlet 16, is not normally used but may be used when it is necessary to remove the material inside of reactor 10. The ceiling of lower manifold chamber 12 consists of a transverse plate 18. A plurality of upright or vertical open cylindrical catalytic tubes designated 20 are threaded into transverse plate 18. Except for the basal openings in the catalytic tubes 20, transverse plate 18 is solid and thus the catalytic tubes 20 provide the sole exit for gases introduced into lower manifold chamber 12 from inlet 14.

The arrangement of the catalytic tubes 20 in catalytic reactor 10 can best be seen by reference to both FIGURES 1 and 2. As seen therein the catalytic tubes 20 are disposed within a median chamber 28, formed between transverse plate 18 and transverse plate 36. The top of catalytic tubes 20 are fitted into transverse plate 36 which is solid. Only a minor fraction of the total number of catalytic tubes 20 are shown in FIGURES 1 and 2, it being understood that substantially the entire cross-sectional area of median chamber 28 contains interspaced catalytic tubes 20.

Figure 3:
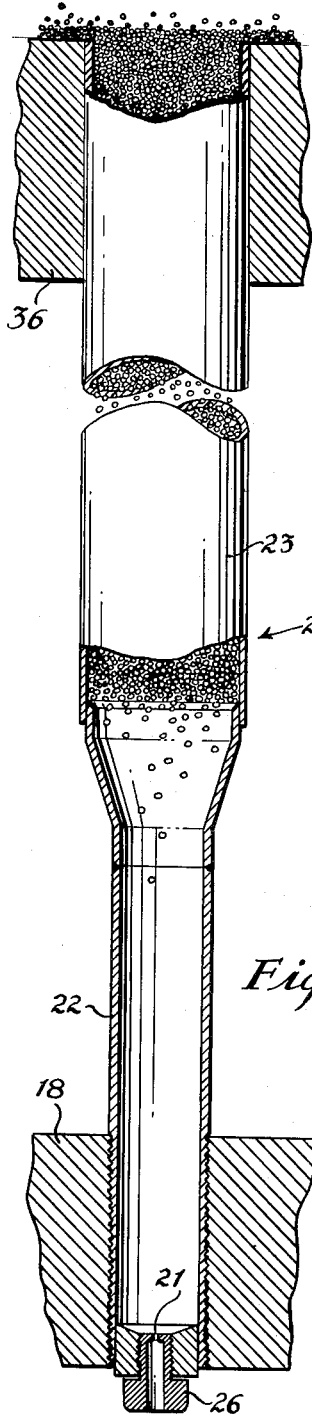
FIGURE 3 is a diagrammatic representation, partly in section and partly in elevation, of a catalytic tube of the catalytic reactor of our invention.

Referring to FIGURE 3, it is seen that each of the catalytic tubes 20 comprises a basal orifice 21, a calming-section 22 and a main body 23. An advantageous arrangement for seating basal orifice 21 into catalytic tube 20 is that shown in FIGURE 3, namely by having orifice 21 located within a hollow threaded bushing 26 threaded into the base of the catalytic tube 20. In the modification shown in FIGURE 3, orifice 21 is located at the base of hollow threaded bushing 26. It is, of course, to be understood that orifice 21 could be inserted into the base of catalytic tube 20 by other means.

Calming-section 22 which is interjacent to basal orifice 21 and the main body 23 of catalytic tube 20 comprises a tube having a relatively smaller cross-sectional area than that of the main body 23 but also having an appreciably larger cross-sectional area than that of basal orifice 21. The cross-sectional area of the calming-section 22 should bear such relationship to the height thereof that the turbulent flow of gaseous reactants issuing from basal orifice 21 at a velocity in excess of that which can maintain catalyst particles of 80 mesh size or smaller as a fluidized bed is substantially reduced in velocity to a lean-phase velocity slightly above that which can maintain such catalyst particles in a fluidized dense-phase bed, and simultaneously the turbulent flow of such gaseous reactants is transformed to straight line flow.

The main body 23 of each of catalytic tubes 20 comprises a cylindrical tube having a cross-sectional area to tube height relationship such that a fluidized dense-phase bed of particles can be maintained therein. Moreover, since the reactor of our invention has primary utility as a reactor for exothermic catalytic reactions, it is also necessary that the cross-sectional area of the tube be limited such that a sufficient amount of external tube surface is available to carry away the heat of reaction. As will be more fully explained below, the reactor of our invention permits the rapid removal of heat from the catalytic tubes 20. For many exothermic reactions, and in particular for the catalytic oxidation of olefins to olefin oxides such as the catalytic oxidation of ethylene to ethylene oxide, a suitable internal tube diameter for main body 23 when using fluidized particles comprising particles small enough to pass through an 80 mesh Tyler screen comprises an internal tube diameter of between about 2 to 6 inches. Moreover, it is advantageous that the catalytic tubes have a main body tube height comprising a height of about 60 times the main body internal diameter, although, of course, the height to internal tube diameter ratio can be varied. We have also found that it is preferable to adjust the size of the opening in the basal orifice so that a fluidized dense-phase bed of catalyst particles can be maintained in the main body 23 of each of catalytic tubes 20 of sufficient height and diameter that the pressure drop of gaseous reactants passing therethrough is about equal to or somewhat less than the pressure drop of such gaseous reactants across the basal orifice 21 of the catalytic tube 20.

Referring again to FIGURE 1, it is seen that median chamber 28 is provided with an inlet 30 at its base and an outlet 32 at its top. Heat-exchange between catalytic tubes 20 and a heat-exchange medium contained in median chamber 28 is effected by the passage of the heat-exchange medium upwardly from inlet 30 through median chamber 28 in heat-exchange relationship with catalytic tubes 20 and out of median chamber 28 through outlet 32. As heretofore indicated, the reactor of our invention has maximum utility for exothermic catalytic reactions, in which case heat is transferred to the heat-exchange medium from the catalytic tubes 20. However, the catalytic reactor of our invention can also be utilized for endothermic catalytic reactions, in which case the heat-exchange medium is heated prior to being introduced through inlet 30 and heat is transferred to catalytic tubes 20. Any suitable heat exchange medium can be utilized, such as water, Dowtherm, etc. In order to increase the rate of heat-exchange, the external surface of the catalytic tubes 20 can be increased by the addition of fins or heat-exchange flanges (not shown). Reactor heat expansion can be compensated for by expansible joints 34 located on the reactor shell wall of median chamber 28.

Upper manifold chamber 38 is disposed above transverse plate 36. A refrigerant member 40, comprising pipes containing a coolant such as cold water or cold Dowtherm, is contained in the lower portion of upper manifold chamber 38. Above the refrigerant member 40 are located a plurality of filters designated 42, attached at their top by plate 44 which is attached to the shell wall of reactor 10.

Figure 4:
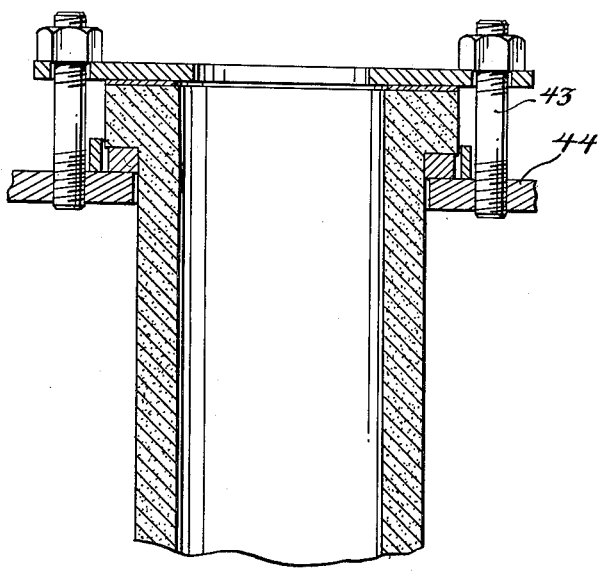
FIGURE 4 is a sectional view of an embodiment of the filter of the catalytic reactor of our invention.
Figure 4:
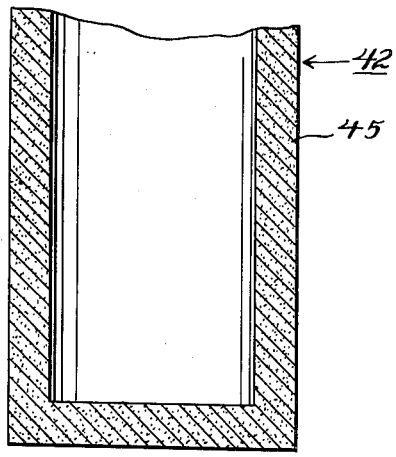

Referring to FIGURE 4, it is seen that each of filters 42 comprises a hollow tube having a porous filter wall 45. Filter wall 45 can be made of any suitable solid porous filter materials which impedes the passage of solid particles but permits the flow of gases therethrough. We have found that porous sintered alumina is especially suitable therefor. Each of filters 42 is bolted by means of top flanges and bolts 42 to plate 44.

Referring again to FIGURE 1, it is seen that filters 42 are in gas communication with the upper portion 46 of upper manifold chamber 38 and reactor outlet 48.

As illustrative of the process for which the catalytic reactor of our invention is adapted, we shall describe the catalytic oxidation of ethylene to ethylene oxide. It is, of course, to be understood that this example is merely illustrative and that the process of our invention can be applied to other reactions.

A gaseous charge comprising ethylene and air at a temperature of about 60° C. and pressurized to a pressure of up to about 200 pounds per square inch, preferably about 100 to 150 pounds per square inch, is introduced into lower manifold chamber 12 through reactor inlet 14. Within lower manifold chamber 12 the gaseous stream of ethylene and air divides into a plurality of streams. Each of these streams is directed upwardly through one of the catalytic tubes 20 disposed in median chamber 28. The main body 23 of each of the catalytic tubes 20 contains a fluidized captive dense-phase bed of catalyst particles comprising particles of about 80 mesh size or smaller. By 80 mesh size we mean particles that will pass through an 80 mesh Tyler screen.

Each stream passes upwardly through orifice 21 at the base of each of the catalytic tubes 20 and is thereby impelled turbulently upward at a high velocity, in excess of that which can maintain 80 mesh size catalyst particles such as those disposed in the main body 23 of catalytic tube 20 as a fluidized bed. After issuing from basal orifice 21, the mixture of ethylene and air passes through calming-section 22 in which its velocity is reduced to a lean-phase velocity, slightly above that which can maintain such catalyst particles as a fluidized dense-phase bed and simultaneously its turbulency is substantially reduced. Thus, a minor amount of catalyst particles are disposed in the form of a fluidized lean-phase bed or fluidized dilute-phase bed in the upper portion of calming-section 22.

The ethylene and air issues from calming-section 22 in substantially straight line flow at a dense-phase velocity, that is a velocity sufficient to maintain the catalyst particles disposed in the main body 23 of catalytic tube 20 in the form of a fluidized dense-phase catalyst bed. We have found that a velocity of the order of those conventionally employed to maintain fluidized dense-phase catalyst beds is to be preferred, such as a linear gas velocity of about one-half to two feet per second. As heretofore mentioned, the catalyst particles disposed in the main body 23 of each of catalytic tubes 20 are in the form of a suspended fluidized captive dense-phase bed. In addition, an equalizer fluidized dense-phase catalyst bed is disposed above each of catalytic tubes 20 surmounting and connecting each of the fluidized dense-phase catalyst beds in each of the catalytic tubes 20 and partially resting on transverse plate 36. The equalizer fluidized dense-phase catalyst bed maintains a uniform catalyst level throughout reactor 10, and thereby equalizes the pressure drop and other process variables in the fluidized captive dense-phase catalyst beds in catalytic tubes 20.

Any of the conventional catalyst compositions can be used in each of the catalyst beds in catalytic tubes 20. Elemental silver-containing oxidation catalysts are most useful.

The oxidation of ethylene which is effected by the contact of the ethylene and air with the catalyst particles, is highly exothermic. A significant portion of the exothermic heat of reaction is removed from catalytic tubes 20 by heat-exchange medium introduced into median chamber 28 through inlet 30 and removed from median chamber 28 by outlet 32. The rate of heat-exchange removal can be controlled by regulating the flow-rate of heat-exchange medium through median chamber 28, or, if desired, each of catalytic tubes 20 can be provided with flanged fins, so that a larger heat-exchange surface is thereby obtained. For the catalytic oxidation of ethylene, we have found it desirable to maintain temperatures of about 265° C. within each of catalytic tubes 20. While an average oxidation temperature of between about 100 to 400° C. can be used in the catalyst beds in catalytic tubes 20, it is preferable to maintain an average temperature of between about 175 to 300° C., and most advantageously the temperature indicated above.

The effluent from the equalizer fluidized dense-phase catalyst bed comprising ethylene oxide, minor amounts of by-product gases such as carbon dioxide and unconverted ethylene and air is withdrawn at a lean-phase velocity through upper manifold chamber 38 and is cooled to a temperature of about 150° C. by heat-exchange contact with refrigerant member 40. It is desirable to cool this effluent to retard further reaction on filters 42. The cooled effluent then passes upwardly through filters 42. Filters 42 remove any entrained particles from the effluent gases, which particles are returned to the equalizer fluidized dense-phase catalyst bed. We have found it desirable to precoat the filter wall 45 of each of filters 42 with a layer of non-catalytic or inert filler particles prior to placing the reactor on-stream in the processing stage. In this manner the build-up of silver particles upon the surface of the filter wall 45 of each of filters 42 is minimized. In many cases, where the inert filler particles comprise a material having an appreciably lower specific gravity than silver, precoating of the filter wall 45 of each of filters 42 is not necessary inasmuch as the silver particles will slough off of the filters 42 due to gravity.

The filtered effluent passes through the upper portion 46 of upper manifold chamber 38 and is removed from reactor 10 through reactor outlet 48. It may then undergo processing to separate the ethylene oxide from the unconverted ethylene and air such as by water absorption. The unconverted ethylene and air can, if desired, be recycled.

The reactor of our invention is particularly useful for exothermic catalytic reactions such as the catalytic oxidation of olefins to olefin oxides. It permits high yields of products to be obtained and a close control of the temperature of reaction. The process for which the catalytic reactor of our invention is adapted permits the efficient catalytic oxidation of olefins to olefin oxides.

It is to be understood that the particular details of apparatus construction and of operation, and the examples of this invention given hereinabove are intended as exemplary and are not to be construed as limiting the scope of this invention except as it may be limited by the following claims.

Having described our invention what we claim as new and desire to protect by Letters Patent is the following:

1. A catalytic reactor for gaseous reactants in motion therethrough, comprising a lower manifold chamber provided with a reactor inlet for introducing the gaseous reactants, an upper manifold chamber, said reactor having an outlet beyond and in gas-communication with said upper manifold chamber, a plurality of upright open catalytic tubes intermediate said manifold chambers, each of said upright open catalytic tubes terminating in a basal orifice of a relatively smaller cross-sectional area than the main body of each of said upright open catalytic tubes, the cross-sectional area of said orifice bearing such relationship to the cross-sectional area of the main body of said upright open catalytic tubes that gaseous reactants entering said orifice are impelled turbulently upwardly therethrough at a velocity greater than the inlet velocity thereof and a velocity in excess of that which can maintain catalyst particles having a mesh size smaller than about 80 mesh suspended as a fluidized bed, a calming-section interjacent said orifice and the main body of said upright open catlytic tubes, said calming-section having a cross-sectional area intermediate the greater cross-sectional area of the main body of said upright open catalytic tubes and the lesser cross-sectional area of said basal orifice, the cross-sectional area of said calming-section bearing such relationship to the height thereof that impelled gaseous reactants passing therethrough from said orifice are reduced to a lean-phase velocity substantially below that of gaseous reactants issuing from said basal orifice but above that of gaseous reactants in the main body of said upright open catalytic tubes and the turbulency of such impelled gaseous reactants is substantially eliminated so that a substantially straight line flow of said gaseous reactants is maintained through the main body of said upright open catalytic tubes at a dense-phase velocity.

2. A catalytic reactor in accordance with claim 1 in which the main body of each of said upright open catalytic tubes is cylindrical and has an internal diameter of between about 2 to 6 inches and a height of about 60 times the internal diameter.

3. A compartmented cylindrical catalytic reactor for gaseous reactants in motion therethrough, comprising a lower manifold chamber provided with a reactor inlet for introducing the gaseous reactants, an upper manifold chamber, said upper manifold chamber having at least one filter for retaining solid particles in said reactor but permitting the flow of gases therethrough, said reactor having an outlet beyond and in gas-communication with said filter, a plurality of upright open cylindrical catalytic tubes intermediate said manifold chambers, each of said upright open cylindrical catalytic tubes terminating in a basal orifice of relatively smaller cross-sectional area than the main body of said upright open cylindrical catalytic tubes, the cross-sectional area of said basal orifice bearing such relationship to the cross-sectional area of the main body of said upright open cylindrical catalytic tubes that gaseous reactants entering said orifice are impelled turbulently upwardly therethrough at a velocity greater than the inlet velocity thereof and a velocity in excess of that which can maintain catalyst particles having a mesh size smaller than about 80 mesh suspended as a fluidized bed, a calming-section interjacent said basal orifice and the main body of said upright open cylindrical catalytic tubes, said calming-section having a cross-sectional area intermediate the greater cross-sectional area of the main body of said upright open cylindrical catalytic tubes and the lesser cross-sectional area of said basal orifice, the cross-sectional area of said calming-section bearing such relationship to the height thereof that impelled gaseous reactants passing therethrough from said basal orifice are reduced to a lean-phase velocity substantially below that of gaseous reactants issuing from said basal orifice but above that of gaseous reactants in the main body of said upright open cylindrical catalytic tubes and the turbulency of said impelled gaseous reactants is simultaneously substantially eliminated so that a substantially straight line flow of said gaseous reactants is maintained through the main body of said upright open cylindrical catalytic tubes at a dense-phase velocity.

4. A compartmented cylindrical catalytic reactor for gaseous reactants in motion therethrough, comprising a lower manifold chamber provided with a reactor inlet for introducing the gaseous reactants, an upper manifold chamber, said upper manifold chamber having at least one filter for retaining solid particles in said reactor but permitting the flow of gases therethrough, said reactor having an outlet beyond and in gas communication with said filter, a median chamber intermediate said lower and upper manifold chambers, said median chamber having an inlet and an outlet for the ingress and egress of a heat-exchange medium, a plurality of upright open cylindrical catalytic tubes disposed in said median chamber, said upright open cylindrical catalytic tubes arranged so that heat-exchange can be effected with a heat-exchange medium contained in said median chamber, each of said upright open cylindrical catalytic tubes terminating in a basal orifice of relatively smaller cross-sectional area than the main body of said upright open cylindrical catalytic tubes, the cross-sectional area of said basal orifice bearing such relationship to the cross-sectional area of the main body of said upright open cylindrical catalytic tubes that gaseous reactants entering said orifice are impelled turbulently upwardly therethrough at a velocity greater than the inlet velocity thereof and a velocity in excess of that which can maintain catalyst particles having a mesh size smaller than about 80 mesh suspended as a fluidized bed, a calming-section interjacent said basal orifice and the main body of said upright open cylindrical catalytic tubes, said calming-section having a cross-sectional area intermediate the greater cross-sectional area of the main body of said upright open cylindrical catalytic tubes and the lesser cross-sectional area of said basal orifice, the cross-sectional area of said calming-section bearing such relationship to the height thereof that impelled gaseous reactants passing therethrough from said basal orifice are reduced to a lean-phase velocity substantially below that of the gaseous reactants issuing from said basal orifice but above that of the gaseous reactants in the main body of said upright open cylindrical catalytic tubes and the turbulency of said impelled gaseous reactants is simultaneously substantially eliminated so that a substantially straight line flow of said gaseous reactants is maintained through the main body of said upright open cylindrical catalytic tubes at a dense-phase velocity.

5. A compartmented cylindrical catalytic reactor for gaseous reactants in motion therethrough, comprising a lower manifold chamber provided with a reactor inlet for introducing the gaseous reactants, an upper manifold chamber, said upper manifold chamber having a plurality of filters for retaining solid particles in said reactor but permitting the flow of gases therethrough, said upper manifold chamber having a refrigerant member below said filters for cooling said upper manifold chamber, said reactor having an outlet beyond and in gas-communication with said filters, a median chamber intermediate said lower and upper manifold chambers, said median chamber having an inlet and an outlet for the ingress and egress of a heat-exchange medium, a plurality of upright open cylindrical catalytic tubes disposed in said median chamber, said upright open cylindrical catalytic tubes arranged so that heat-exchange can be effected with a heat-exchange medium contained in said median chamber, each of said upright open cylindrical catalytic tubes terminating in a basal orifice of relatively smaller cross-sectional area than the main body of said upright open cylindrical catalytic tubes, the cross-sectional area of said basal orifice bearing such relationship to the cross-sectional area of the main body of said upright open cylindrical catalytic tubes that gaseous reactants entering said orifice are impelled turbulently upwardly therethrough at a velocity greater than the inlet velocity thereof and a velocity in excess of that which can maintain catalyst particles having a mesh size smaller than about 80 mesh suspended as a fluidized bed, a calming-section interjacent said basal orifice and the main body of said upright open cylindrical catalytic tubes, said calming section having a cross-sectional area intermediate the greater cross-sectional area of the main body of said upright open cylindrical catalytic tubes and the lesser cross-sectional area of said basal orifice, the cross-sectionl area of said calming-section bearing such relationship to the height thereof that impelled gaseous reactants passing therethrough from said basal orifice are reduced to a lean-phase velocity substantially below that of the gaseous reactants issuing from said basal orifice but above that of the gaseous reactants in the main body of said upright open cylindrical catalytic tubes and the turbulency of said impelled gaseous reactants is simultaneously substantially eliminated so that a substantially straight line flow of said reactants is maintained through the main body of said upright open cylindrical catalytic tubes at a dense-phase velocity.

6. A compartmented cylindrical catalytic reactor for gaseous reactants in motion therethrough, comprising a lower manifold chamber provided with a reactor inlet for introducing the gaseous reactants, an upper manifold chamber, said upper manifold chamber having a plurality of filters for retaining solid particles in said reactor but permitting the flow of gases therethrough, said upper manifold chamber having a refrigerant member below said filters for cooling said upper manifold chamber, said reactor having an outlet beyond and in gas-communication with said filters, a median chamber intermediate said lower and upper manifold chambers, a plurality of upright open cylindrical catalytic tubes disposed in said median chamber, said upright open cylindrical catalytic tubes arranged so that heat-exchange can be effected with a heat-exchange medium contained in said median chamber, the main body of each of said upright open cylindrical catalytic tubes having an internal diameter of between about 2 to 6 inches and a height of about 60 times the internal diameter, each of said upright open cylindrical catalytic tubes terminating in a basal orifice of relatively smaller cross-sectional area than the main body of said upright open cylindrical catalytic tubes, the cross-sectional area of said basal orifice bearing such relationship to the cross-sectional area of the main body of said upright open cylindrical catalytic tubes that gaseous reactants entering said orifice are impelled turbulently upwardly therethrough at a velocity greater than the inlet velocity thereof, and a velocity in excess of that which can maintain catalyst particles having a mesh size smaller than about 80 mesh suspended as a fluidized bed, a calming-section interjacent said basal orifice and the main body of said upright open cylindrical catalytic tubes, said calming-section having a cross-sectional area intermediate the greater cross-sectional area of the main body of said upright open cylindrical catalytic tubes and the lesser cross-sectional area of said basal orifice, the cross-sectional area of said calming-section bearing such relationship to the height thereof that impelled gaseous reactants passing therethrough from said basal orifice are reduced to a lean-phase velocity substantially below that of the gaseous reactants issuing from said basal orifice but above that of the gaseous reactants in the main body of said upright open cylindrical catalytic tubes and the turbulency of said impelled gaseous reactants is simultaneously substantially eliminated so that a substantially straight line flow of said gaseous reactants is maintained through the main body of said upright open cylindrical catalytic tubes at a dense-phase velocity and expansible joints on the walls of the median chamber for compensating for reactor heat expansion.

7. A catalytic reactor for gaseous reactants in motion therethrough, comprising a lower manifold chamber provided with a reactor inlet for introducing the gaseous reactants and including a tube-plate forming the upper wall thereof, an upper manifold chamber having a tube-plate forming the lower wall thereof and having an outlet for the discharge of the products of the reaction, a plurality of upright catalytic reactor tubes intermediate said tube-plates and sealed thereto and communicating therethrough with the corresponding manifold chambers, an orifice beneath and in communication with each reactor tube and operatively disposed between it and the lower manifold chamber and constituting the sole communication for the passage of fluid therebetween, the cross-sectional area of the orifice bearing such relationship to the cross-sectional area of the catalytic reactor tube and to the cross-sectional area of said lower manifold chamber and of the inlet thereof that gaseous reactants passing from said lower manifold chamber through said orifice are impelled upwardly therethrough at a velocity very much greater than the velocity of said gases in said lower manifold chamber and also very much greater than the velocity of said gases in the catalytic reactor tube; said orifice being so short as not significantly to limit the rate of flow of such reactant gases through the catalytic reactor tube, and a calming-tube intermediate said orifice and said reactor tube, said calming-tube having cross-sectional area less than that of the reactor tube and greater than that of the orifice and having a length and cross-sectional area in relation to the cross-sectional area of the orifice such that the turbulence in the reactant gas, created by the orifice, will be substantially dissipated in the calming-tube and the flow through the reactor-tube will be relatively non-turbulent.

References Cited in the file of this patent

UNITED STATES PATENTS

| | | |
|---|---|---|
| 2,173,984 | Shapleigh | Sept. 26, 1939 |
| 2,198,555 | Wilson | Apr. 23, 1940 |
| 2,430,443 | Becker | Nov. 17, 1947 |
| 2,475,025 | Huff | July 5, 1949 |
| 2,539,847 | McGrath | Jan. 30, 1951 |
| 2,554,435 | Wiber | May 22, 1951 |
| 2,555,129 | Hagerbaumer | May 29, 1951 |
| 2,628,965 | Sullivan | Feb. 17, 1953 |
| 2,631,159 | Keith | Mar. 10, 1953 |

FOREIGN PATENTS

| | | |
|---|---|---|
| 680,467 | Germany | Aug. 10, 1939 |